United States Patent Office 3,576,679
Patented Apr. 27, 1971

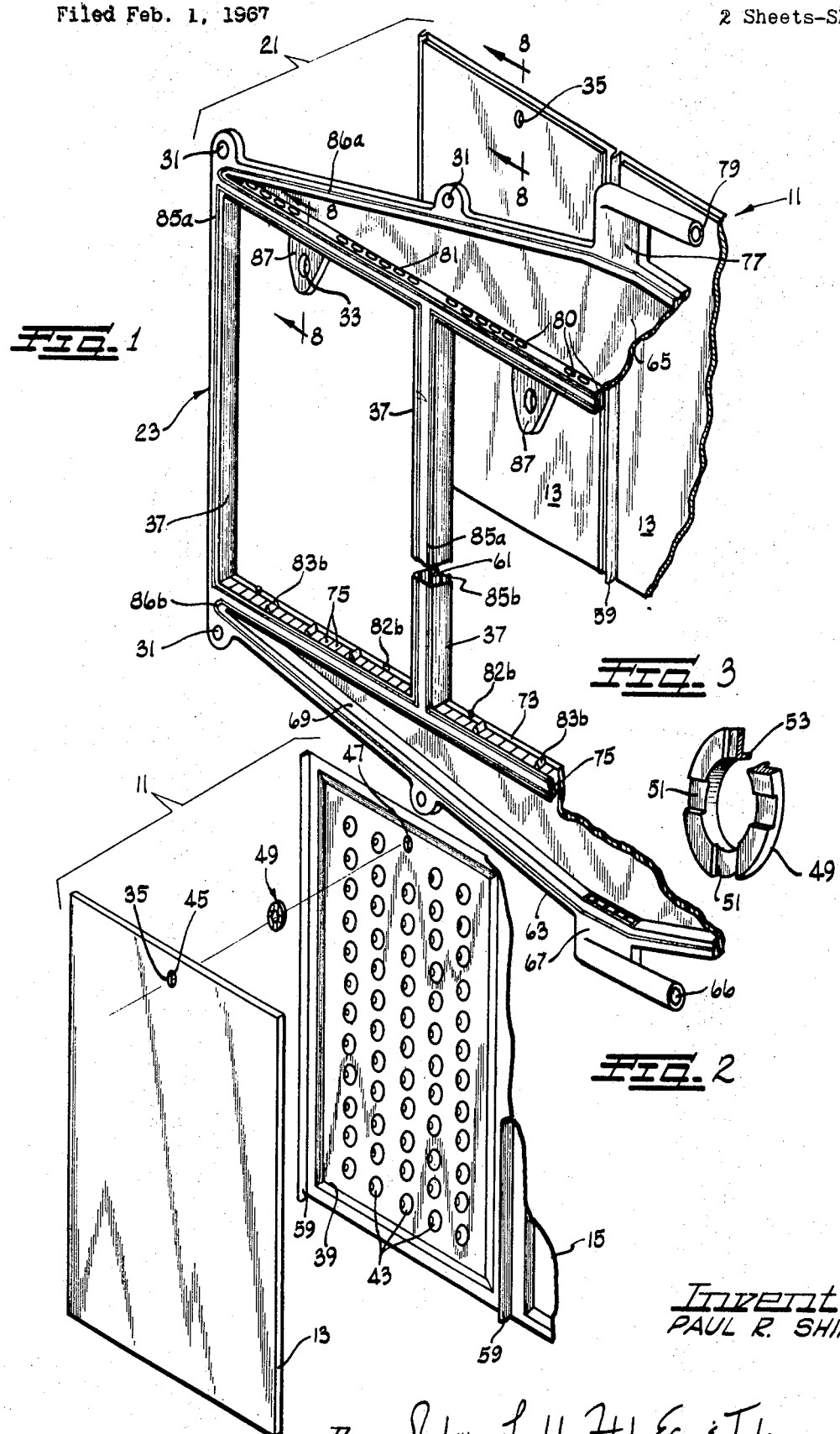

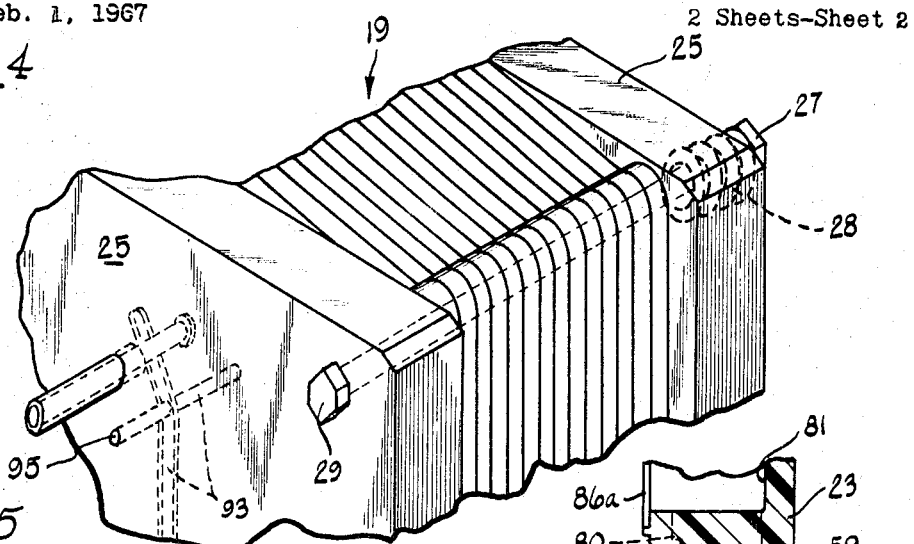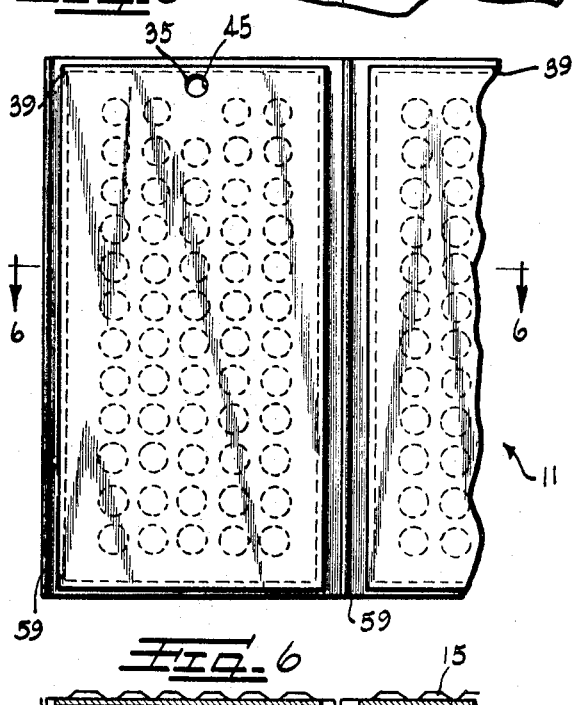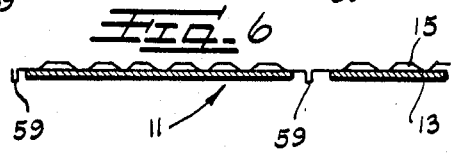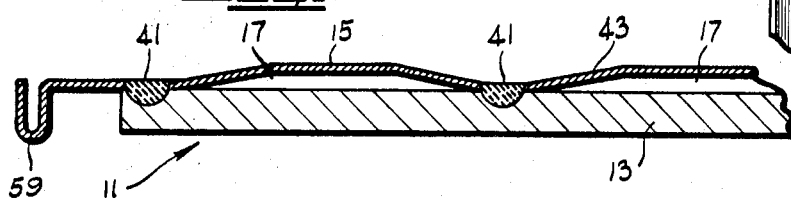

3,576,679
ELECTRODE ASSEMBLY
Paul R. Shipps, El Cajon, Calif., assignor to Gulf Energy & Environmental Systems, Inc., San Diego, Calif.
Filed Feb. 1, 1967, Ser. No. 613,180
Int. Cl. H01m *13/00*
U.S. Cl. 136—120                                   7 Claims

ABSTRACT OF THE DISCLOSURE

The disclosure shows a thin electrode assembly for a storage battery or fuel cell using a gaseous reactant and a liquid electrolyte. A storage battery cell stack employs several electrode assemblies each constructed of a thin plate porous to the gaseous reactant which plate is connected mechanically and electrically at a plurality of points across its surface to a very thin metal plate that is deformed to provide a gas plenum chamber between the two plates. The exposed surface of the deformed plate is used as a substrate to support a deposit of an electropositive material, like zinc, for the anode of the next cell in the cell stack.

---

This application relates to electrochemical cells and more particularly to electrode assemblies for liquid electrolyte fuel cells and storage batteries.

It is an object of the present invention to provide an improved electrode assembly for an electrochemical cell. It is a more particular object to provide a thin electrode assembly well suited for use in a cell stack of a large number of electrochemical cells. It is a further object to provide an improved electrochemical cell assembly that includes a cathode that is electrically and mechanically connected to an anode for the next adjacent electrical electrochemical cell in a cell stack. Still another object is to provide an electrode assembly including at least one electrode that is a porous member to which gas is supplied during electrochemical operation. A still further object is to provide an electrode assembly for a gas-fed electrochemical cell to be used in a cell stack which assembly includes means for preventing substantial loss of supply gas or of gas pressure should rupture of the porous member occur. Another object is to provide internal structural strength in such an electrode assembly suited to light weight construction. Still another object is to provide an electrode assembly suitable to modular construction and assembly in cell stacks of various configurations. A still further object is to provide electrical current path redundancy such that serious degradation or failure of one of the several assemblies or plate members in a given cell will cause only a minor effect on the electrical output of a series-connected cell stack. A further object is to provide a sealing means integral to each electrode assembly for sealing the electrolyte path within each cell and between adjacent cells. These and other objects of the present invention are more specifically set forth in the following description and in the accompanying drawings wherein:

FIG. 1 is an exploded fragmentary perspective view of an electrochemical cell subassembly of a cell stack embodying various features of the invention;

FIG. 2 is an exploded perspective view of an electrode assembly which is a part of the cell stack subassembly shown in FIG. 1;

FIG. 3 is an enlarged perspective view, partly broken away of one element shown in FIG. 2;

FIG. 4 is a perspective view of an assembled cell stack employing a plurality of the subassemblies shown in FIG. 1;

FIG. 5 is a front elevational view of the electrode assembly of FIG. 2 shown in assembled condition;

FIG. 6 is a horizontal sectional view taken generally along the line 6—6 of FIG. 5;

FIG. 7 is an enlarged fragmentary view of FIG. 6; and

FIG. 8 is an enlarged fragmentary vertical sectional view, of a portion of the subassembly of FIG. 1 illustrated in assembled position, shown generally along line 8—8 of FIG. 1.

This invention is described hereinafter with relationship to a zinc-air storage battery although it should be understood that the invention is applicable to other types of other electrochemical cells for the generation of electricity. A zinc-air storage battery wherein this invention may be employed is illustrated and described in detail in pending U.S. patent application Ser. No. 525,815, filed Jan. 14, 1966 in the names of Ulrich Merten and John Porter II, and assigned to the assignee of this application, and the details of this pending patent application are incorporated herein by reference.

It should be possible to completely understand the present invention by realizing that the abovementioned storage battery employs a plurality of electrochemical cells each of which incorporates an anode of metallic zinc and a porous cathode plate to which an oxygen-containing gas is supplied. A liquid electrolyte, such as an aqueous solution of potassium hydroxide, is circulated through each of the electrochemical cells during discharging and during charging of the storage battery. When air is employed as the oxygen-containing gas, it is bubbled through the porous cathode into the circulating electrolyte stream and the unreacted portions of the air are separated from the recirculating electrolyte stream at a location exterior of the electrochemical cells. The zinc oxide reaction products which are created during discharge of the cells are carried from the electrochemical cells and are likewise separated from the electrolyte stream exterior of the cells. The separated reaction products are stored in a condition wherein they can be returned to the cells by the circulating electrolyte stream during recharging of the battery.

An electrode assembly 11 having advantageous characteristics is provided by electrically and mechanically connecting a porous electrode plate member 13, near the periphery thereof, to a thin electroconductive backing member 15. The backing member 15 serves a dual function; it defines a gas plenum chamber 17, in association with the porous plate 13 and it also acts as a substrate upon which the electrochemically active material, which constitutes the opposite electrode, can be supported.

An illustrative example of a cell stack 19 is shown in assembled condition in FIG. 4 and comprises a plurality of subassemblies 21, each of which includes a frame 23 which mates with an electrode assembly 11, as best seen in exploded condition in FIG. 1. The subassemblies 21 are fairly flat in shape and are held in abutting, aligned relationship by clamping them between a pair of end plates 25 which are interconnected by a plurality of bolts 29, many of which pass through lug holes 31 provided in the frames 23 at the desired locations, which bolts use Belleville washers or strong springs 28 and nuts 27 to maintain tension. The frames 23 are made of a suitable electrically insulating material, as for example polypropylene or polyethylene. Instead of heavy, solid plates 25, it may be desirable to use thinner plates which are reinforced by suitable bracing members to save weight.

Suitable passageway means is provided through which the oxygen-containing gas is fed to the plenum chambers 17 of the individual electrochemical cells. As is best seen in FIGS. 1 and 2, the individual frames 23 and electrode assemblies 11 are provided with passageways 33, 35 extending therethrough at similar locations. When the subassemblies 21 are assembled into the cell stack 19, the passageways 33 in the frames and the apertures 35 in the electrode assemblies are aligned and form gas supply manifold passageways which extend from one end of the stack to the other. As will be explained in detail hereinafter, each of the subassemblies 21 includes its own electrolyte inlet and outlet passageways through which a parallel flow of electrolyte is established through each of the individual electrochemical cells.

As best seen in FIG. 1, each one of the subassemblies 21 includes a plurality of electrochemical cell units. In one embodiment, four electrochemical cell units are defined in part by each frame 23 and are arranged in what may be termed four-abreast fashion. Accordingly, each frame member 23 includes four rectangular vacant portions 37, the longer axes of which lie in the vertical direction in the normal orientation of cell stack 19. As should be appreciated, four separate electrode assemblies could be employed, one in association with each of the vacant portions 37. However, in the preferred embodiment illustrated, the electrode assemblies 11 for each frame member 23 are joined as a single composite assembly in which four porous cathode plates 13 are attached to a common backing plate 15.

As will be fully apparent in the following discussion of the individual electrode assemblies 11, each assembly includes the cathode from one electrochemical cell and the support for the anode from the next adjacent electrochemical cell. Accordingly, a complete functional electrochemical cell is not provided until two of the assemblies are disposed in facing relationship. However, the electrode assembly 11 is of such a construction that the cathode from one cell is in electrical connection with the anode from the next adjacent cell and thereby the aligned cells in the assembled cell stack 19 are connected in series electrical connection. Moreover, the four cells in each subassembly 21 are connected in parallel electrical connection through the common backing plate 15. A desirable feature of the parallel electrical connections is the electrical redundancy thus provided; should degradation or failure occur in one or more cell units, the remaining well-performing cell units carry the current intended for the complete set of parallel connected cell units.

It is believed that the invention will be best understood by a description first of the individual electrode assembly 11 followed by a description of the composite frame 23 wherein it resides. Because all four of the cell units which make-up the composite assembly of four-abreast are substantial duplicates of one another, the specific description is hereinafter generally limited to a single cell unit of the complete electrode assembly 11.

As best seen in FIG. 2, each individual cell unit of the electrode assembly 11 comprises a rectangular flat porous plate 13 of dimensions proportioned to fit within the rectangular vacant portion 37 provided in the frame 23. The porous plate 13 is made of a suitable electroconductive material which is not affected by the electrochemical reaction that takes place in the electrochemical cell during either charging or discharging of the storage battery. For use in a zinc-oxygen electrochemical cell, the porous plate 13 is preferably formed by hot-pressing or by pressing and sintering a suitable inert metal powder, such as carbonyl nickel powder, having a large surface area per unit weight.

The backing member 15 is also made of a suitably inert material, such as mild steel, which may be deformed to provide a depression 39 therein, which depression is generally rectangular in shape and of slightly smaller dimensions than the porous plate 13. By suitably joining the backing member 15 to the porous plate 13, generally along the peripheral edges of the porous plate, the gas plenum chamber 17 is created therebetween. By joining the porous plate 13 to the backing member 15 in a manner in which both a mechanical and an electrical connection are provided, the series electrical connection between adjacent aligned electrochemical cells in the cell stack 19 is simultaneously accomplished.

It has been found that a thin backing plate, which may have a thickness of only about 0.005 inch as compared to a thickness of about 0.020 to 0.050 inch for the porous cathode plate 13, may be suitably attached to the cathode plate via welding. Moreover, this method of attachment lends itself to automatic production which can considerably reduce the cost of a cell stack of this type. In order to permit the use of a thin backing member and thin cathode plates, and concurrently maintain a nearly constant thickness of the electrode assembly when subjected to gas pressure within the plenum chamber 17, a series of welds 41 are used between the porous plate 13 and the backing member 15 across the region of the plenum chamber. Means for making the connecting welds 41 are provided by forming a regular series of dimples 43 spaced throughout the area of the depression 39 in the backing member (see FIG. 2). As best seen in FIGS. 7 and 8, the apex of each dimple 43 is welded to the adjacent surface of the porous plate 13. By this arrangement, sufficient support is provided the fairly thin backing member 15 and porous cathode 13 across the region of the plenum chamber 17 to prevent any signficant bowing or deformation from occurring as a result of exposure to the pressure differential thereacross created by the employment of greater than atmospheric pressure in the plenum chamber 17.

The oxygen-containing gas is supplied to the plenum chambers 17 through the holes 45 and 47 which are provided in the porous plate 13 and in the backing member 15, respectively. The two holes 45 and 47, plus a grommet 49, constitute the passageway 35 through the electrode assembly 11. As previously indicated, in the assembled cell stack 19, the aligned passageways 33 and 35 constitute a gas supply manifold passageway which runs from one end to the other end of the cell stack. As should also be apparent, in the illustrated arrangement where there are groups of four individual electrochemical cells abreast, there are four separate gas supply manifold passageways. In order to prevent a major loss of oxygen-containing gas pressure throughout one of the manifold passageways should a rupture occur in one of the porous cathode plates 13, flow restriction means is provided in each of the individual electrode assemblies.

In the illustrated embodiment, the flow restriction means is provided by the grommet 49 which has a plurality of radially extending openings 51 therein (see FIGS. 2 and 3). As best seen in FIG. 3 the grommet 49 has the general shape of a flat ring having an upstanding tubular flange 53 at one surface thereof which fits through the hole 47 in the backing member 15. The thickness of the grommet 49 is such that it snugly resides in the depression 39 formed in the backing member 15, sandwiched between the porous plate 13 and the backing member 15. As seen in FIG. 8, the tubular flange portion 53 of the grommet 49 extends through the backing member 15 and its end is spread outwardly, as by peening, so as to secure the grommet in this location. As seen in FIG. 3, four radial openings 51 are provided in the grommet 49.

The number and cross sectional area of these openings 51 is carefully regulated so that sufficient gas flow therethrough is accommodated during normal operation of the storage battery without an undesirably large pressure drop. The porous cathode plate 13 constitutes the end of the line for gas flow in each electrochemical cell, and the porous plates themselves, when wet with electrolyte create most of the back pressure in the line due to the small pores of the porous plate and the surface tension of the electrolyte. The openings 51 in the grommets 49 are constructed of sufficient size so as to constitute less of a restriction to gas flow therethrough than the porous plates 13 when wet with electrolyte. Accordingly, the further restriction to flow created by the individual grommets 49 does not unreasonably raise the gas pumping requirements, and thus the grommets 49 are not an important factor so long as all of the porous plates 13 maintain their integrity, as they are fully expected to do. However, if for some unknown reason one of the plates 13 should fail, the associated grommet 49 performs an important throttling function and prevents escape of a substantial amount of gas in one of the manifold passageways from being channelled through the ruptured porous plate. Such a diversion of gas would result in an immediate pressure drop in, and reduced gas supply to, the other electrochemical cells, thus causing a substantial impairment of the efficiency of the overall system. Because the effect of the flow restriction provided by the grommet 49 increases rapidly with increasing gas flow, the grommet is designed to provide a pressure drop nearly equal to that caused by a normally functioning wet porous plate with a tolerable increase in gas flow, thereby minimizing the pressure drop in the overall system as well as the potential gas loss through the ruptured porous plate.

Whereas the surface of the backing member 15 which faces the connected porous cathode plate 13 serves as one boundary for the plenum chamber 17, the opposite surface of the backing member 15 is used as a substrate upon which anodic material 55 is supported (see FIG. 8). In the preferred embodiment of a zinc-oxygen storage battery, dense metallic zinc 55 is electroplated onto the opposite surface of the backing member 15 to produce the anode. The anode deposit generally assumes the same dimensions as the porous cathode plate, i.e., it extends laterally over the surface of backing member 15 to where its surface is interrupted by dielectric frame material. The anode 55 is preferably initially proportioned to interfit within the vacant portion 37 provided in the frame member 23 by electroplating onto the backing member 15 in the assembled cell stack. The thickness of the anode deposit and the thickness of the frame 23 are regulated with respect to each other so that a suitable gap is left in the vacant portion of the frame between the closest points of proximity of the anode and the porous cathode plate of the next adjacent electrode assembly 11 with which it forms the electrochemical cell. It is this gap which serves as the passageway through which the liquid electrolyte is pumped, as will be more fully explained hereinafter.

Because of the provision of the plurality of dimples on the backing member 15, the anode deposit 55 which results from the electroplating operation is not flat but has a plurality of valleys coinciding with each of the dimples. An anode of such uneven configuration may be preferable to a flat surface because, for a given rectangular set of dimensions, a slightly greater anode surface area is exposed to the electrolyte. Flow turbulence may also be favorably affected by pumping the circulating electrolyte stream past other than a flat tangent surface. Accordingly, the slight increase in surface area plus the uneven configuration are considered desirable features of the backing plate 15 in its function as a substrate for supporting the anode 55.

Although the anode material might be pre-deposited upon the backing member 15 before assembly of the cell stack 19, it is advantageous to assemble the subassemblies 21 as the cell stack and then deposit the anodes 55 in a manner similar to normal charging of the battery, as by circulating a suitable electroplating solution through each of the electrochemical cells while applying suitable electrical current and voltage to cause the desired electroplating to take place on the substrate portions of each of the backing members 15. Depositing of the anodic material 55 in this fashion closely resembles the recharging of the storage battery after it has been discharged in the generation of electrical power.

As perhaps best seen in FIGS. 2 and 7, the backing plates 15 are bent to form vertically extending side flanges 59 which lie adjacent the outer end of the depression 39 for each cell in the four-abreast subassembly and are parallel to the longer side of the rectangular vacant portion 37. These side flanges 59 extend outward from the surface of the backing plate 15 which is connected to the porous cathode plates 13 and are received in suitable slots 61 (FIGS. 1 and 8) which are formed in the frames 23. When the side flanges 59 are seated in the slots, the composite electrode assembly is positioned at the desired location in the frame so that the four rectangular porous cathode plates 13 are received in the generally rectangular vacant portions provided in the frame. The side flanges serve the additional function of restraining the sides of the frames 23 so that they cannot be deflected or bowed outward by the electrolyte pressures within the cell stack. Thus, electrolyte pressure loads on the frame sides are easily carried by tension in the backing plate 15; such pressure loads might otherwise be carried by bending reactions of the frame sides, which are relatively weak in this respect.

Each of the frames 23, as best seen in FIG. 1, is constructed so as to provide four substantially duplicate subframes arranged in four-abreast fashion. This multiple arrangement of the composite frame reduces production and assembly costs by permitting frames for four individual electrochemical cells to be made simultaneously, as by injection-molding polyethylene or polypropylene, and easily assembled as a cell stack 19 without the necessity of mechanically interconnecting laterally adjacent cell units. With the exception of the common electrolyte inlet and outlet manifolding, each of the sub-frames is a substantial duplicate of the next, and the specific description is generally limited to one of the sub-frames.

In general, each frame 23 contains the four rectangular vacant portions 37, a lower common fluid inlet manifold system 63 and an upper fluid outlet manifold system 65. The lower fluid inlet manifold system 63 comprises an electrolyte inlet tube 66 which leads upward through a neck portion 67 terminating in openings which extend through the central portion of the lower wall of the frame. Alternate frames 23 are provided with either short neck portions 67 or longer neck portions (not shown) so that inlet tubes 66 of circular cross section may be used without spacially interfering with one another. The neck portion 67 opens into a trapezoidal shaped liquid plenum chamber 69 which is formed in and thus opens through one surface of the frame and does not extend completely through the frame 23.

To further assure a substantially equal flow distribution pattern of the electrolyte across the width of each of the cell units, a flow distribution bar 73 is formed as a part of each sub-frame between the trapezoidal-shaped inlet plenum chamber 69 and the region of the vacant portion 37. A plurality of inverted generally conical entry ports or nozzles 75 are provided in the bar 73 for the fluid communication therethrough which ports provide a flow restriction causing an electrolyte pressure drop thus tending to equalize the amount of electrolyte flowing through each port. The provision of the ports 75 which enlarge in cross section in the direction of flow therethrough assures a good distribution of flow across the region of the vacant portion 37, which of course in the assembled cell stack constitutes the electrolyte passageway through the individual electrochemical cells.

The upper outlet manifold system 65 includes a generally similar neck portion 77 which opens through the upper wall of the frame and which is connected with an outlet tube 79 that carries the electrolyte from the four electrochemical cell units to a discharge line. Alternate frames 23 are likewise provided with long neck portions 77 or shorter neck portions (not shown). Holes 80, which are generally cylindrical in shape, provide communication between the upper ends of the vacant portions 37 and a common, generally trapezoidal plenum chamber 81 that meets the neck portion 77.

Protrusions 82a (FIG. 8) and 82b (FIG. 1) are provided at the top and bottom of the vacant portions 37, respectively, to space the upper and lower edges of the cathode plates 13 from the adjacent inner edges of the sub-frames. Spacers 83a and 83b are provided to assist in stabilizing the cathode plates 13, as viewed in FIGS. 1 and 8. The electrode assembly 11 is primarily located by the backing plate 15, the spacers 83a and 83b serve to limit deflections and possible vibrations of the electrode assembly 11. The exposed surface of the cathode plate 13 seats against the spacers 83a (FIG. 8) and 83b which thus limit the extent of its entry into the vacant portion 37 of the frame 23.

Each of the sub-frames 23 is self-sealing with the next adjacent sub-frame and requires no ancillary gasket. The self-sealing feature is accomplished by thin upstanding ridges 85a and 85b (see FIGS. 1 and 8) which runs around the rectangular periphery of the vacant portion 37 on both sides thereof and provide a seal against the flat surface of the backing plate 15 outward of the region of the depression. Similar sealing ridges 86a and 86b surround the outlet electrolyte plenum 81 and the inlet electrolyte plenum 69, respectively. In the assembled cell stack, the sealing ridges 86a and 86b abut the opposite flat surface of the next adjacent frame and serve to prevent any outward leakage of fluid electrolyte from the electrolyte plenum chambers which they surround. The provision of these integral sealing ridges obviates the need for any separate gaskets between adjacent frames and thus simplifies the assembly of the assemblies 21 as a part of the cell stack.

To complete the individual gas manifold passageways which serve each bank of aligned cell units, each sub-frame 23 is provided with a connector element 87, of a shape designed to minimize electrolyte flow resistance, which is molded as an integral part thereof and which depends into the vacant region 37. The connector element 87 contains the transverse hole 33 which is aligned with the pair of holes 45 and 47 extending through the porous cathode plate and the backing member. Counterbores 91a and 91b are provided on the sides of the hole 33 through this connector element wherein O-rings 92a and 92b are seated. Moreover, the peened end of the grommet 49 is partially accommodated in the counterbore 91a. When the frames 23 are installed in the cell stack, the endwise pressure which is applied by the tightening of the nuts 27 on the bolts 29 causes the connector element portions 87 and the O-rings 92a and 92b to effectively connect and seal the passageway 45 in the porous cathode plate to the passageway in the backing member that supports the anode which combines with it to form the other half of the electrochemical cell. Thus, the connector elements 87 complete the gas manifold passageways between the individual aligned electrode assemblies in the cell stack.

When a cell stack, such as that illustrated in the drawings, having the zinc anode material supported in place at the desired locations on the backing members, is connected to the necessary auxiliary units, it is ready for operation and generation of electrical current. Although any suitable oxygen-containing gas may be employed in the storage battery, as for example pure oxygen, it is convenient to use air from the atmosphere which can be supplied by connecting an air compressor to the gas supply line leading to the gas manifold tubes. The electrolyte supply tubes 66 are connected to a common supply line which is in fluid communication with a source of electrolyte, as for example at 20 weight percent solution of potassium hydroxide. The electrolyte discharge line, which is connected to the electrolyte discharge tubes 79 from the individual electrochemical cells is linked to the electrolyte supply line via a recirculation circuit.

The recirculation circuit normally includes a gas-liquid separator wherein the nitrogen and any unreacted oxygen from the air are separated from the liquid electrolyte and vented to the atmosphere. It also includes a storage sump into which the electrolyte is directed after separation of the gases. A pump is provided to withdraw the electrolyte from the sump and continuously feed it to the electrolyte supply line. The conduit leaving the pump is branched so as to direct a portion of the electrolyte flow through a separation and storage means wherein the reaction products created during the electrochemical discharge of the cell stack are separated from the electrolyte stream and stored in a condition wherein they can readily be returned to the cell stack via the recirculating electrolyte stream when the battery is being recharged.

EXAMPLE

In one illustrative embodiment of the invention, a four-abreast type frame 23 is employed which has a thickness of about 0.25 inch plus the upstanding sealing ridges 85a and 85b of about 0.01 inch. The frame is of sufficient height and width to include therein four rectangular vacant portions 37 having dimensions of about 7.1 inches x 3.6 inches. The porous cathode plates 13 which fit into these rectangular vacant portions are about 3.5 inches x 7 inches. The plates 13 may be made by hot-pressing or pressing and sintering carbonyl nickel powder and have a thickness of about 0.050 inch. The thin backing member 15 is made of mild steel of a thickness of about 0.005 inch. The side of the backing member 15 which is attached to the porous cathode plate 13 is electroplated with nickel to prevent oxidation or rusting of the mild steel when the plenum chamber 17 is exposed to a moisture containing gas such as air. The depression 39 in the backing member 15 which forms the plenum chamber 17 measures about 0.025 inch at its greatest dimension. Dimples are provided in the baking member extending toward the associated porous cathode plate arranged in twelve aligned rows of five each. One dimple is omitted at the location closest to the manifold gas passageway. Each of the dimples terminates in a flat circular surface which is welded to the porous plate, each surface having a diameter of about 0.13 inch.

Metallic zinc is electroplated onto the exposed substrate surface of the backing plates over a nominal area approximately equal to the area of the porous cathode plate, i.e., 7 inches x 3½ inches. The electroplating of the zinc is carried out under conditions so as to deposit about 0.1 to 0.2 ounce of zinc per square inch of surface for a zinc deposit having a thickness of 0.03 to about 0.1 inch upon the uneven substrate. Accordingly, considering the total thickness of the frame to be 0.25 inch, the greatest thickness of the electrode assembly 11 to be about 0.08 inch, and the average thickness of zinc deposit to be about 0.07 inch, in the assembled electrochemical cell stack, there is a gap of about 0.10 inch as an average in the charged state and about 0.17 inch in the discharged state from the zinc anode to the opposite facing porous plate. It is this gap in the assembled electrochemical cells which constitutes the electrolyte passageway and wherein the circulating electrolyte stream is pumped from the bottom of each electrochemical cell unit to the top thereof. This continuous flow of electrolyte during discharging of the cell stack and during recharging of the cell stack facilitates the efficient electrochemical operation of the cells and keeps the reaction products from collecting on the anode.

The gas passageways 45 and 47 through the porous plate 13 and the backing member 15 of each electrode assembly are about 0.2 inch in diameter. The grommet 49 which is fit into each individual electrode assembly 11 is made of a suitable material, such as iron, stainless steel or nickel, and contains an internal bore therethrough of about 0.19 inch and a total thickness of about 0.037 inch prior to spreading of the tubular portion 53. The main portion of the grommet 49 which is seated in the plenum chamber 17 between the porous plate 13 and the backing member 15 has a thickness of 0.025 inch (the maximum depression of the backing member) and an outer diameter of about 0.3 inch. The four radially extending openings 51 in the grommet 49 each have a width of about 0.062 inch and a depth of about 0.020 inch. The oxygen-containing gas passes through these four openings 51 from the gas manifold passageway to each individual plenum chamber, and it is these slots which provide the desirable throttling effect should rupture of a porous plate 13 occur.

Temperature control means is incorporated in the recirculation system to maintain the electrolyte temperature at about 70° C. during discharge of the battery. Pumping of the electrolyte into the battery cell stack is maintained at a sufficient rate so as to establish a linear flow rate of electrolyte within each of the electrochemical cells of about 2 to 3 feet per second during discharge and about 6 to 8 feet per second during charge. Air is pumped into the plenum chambers 17 of each electrochemical cell adequate to cause the desired air flow through the porous nickel and typically at a pressure of about 15 p.s.i.g. Maintaining this air pressure, temperature and electrolyte flow rate during discharge of the battery, the no-load voltage of each of the cells measures about 1.4 volts. At up to about 100 ma./sq. cm., the voltage is about 1.2 volts; and at up to about 300 ma./sq. cm., the voltage is about one volt. In a cell stack of 15 frames each of which includes four electrochemical cell units abreast connected in parallel by a common backing plate, about 4 to 8 kilowatt hours of electrical energy are produced per charging cycle, at a designed power output of about four kilowatts, discharging the anodes to about 90% of the metallic zinc.

In the clamping plate 25 at the end of the cell stack into which the oxygen-containing gas is fed, a gas relief groove 93 is cut in the surface thereof facing the electrode assemblies 11. A vent hole 95 extends from the gas relief groove 93 out through the end plate. In case some unexpected rupture or severe air leak of the manifold passageway should occur, the gas pressure will be relieved through the groove 93 and hole 95, thus preventing possible rupture of the porous cathode plates before the trouble can be corrected.

Modifications of the invention such as may occur to one skilled in the art are considered to fall within the scope of the invention which is defined in the appended claims.

What is claimed is:
1. An electrode assembly for use in an electrochemical cell stack, which assembly comprises a plurality of cells, each cell comprising a porous electroconductive plate which allows the passage of gas transversely therethrough, a gas-impervious metal plate having a depression formed therein adjacent each said porous plate, means joining and electrically connecting said plates to each other at a location generally along the periphery of said depression to prevent fluid flow therebetween at the joinder and create a plenum chamber, entrance means in at least one of said joined plates for supplying gas to said plenum chamber, means connected to said entrance means containing gas supply manifold passageways for receiving gas supplied to said entrance means, and flow restriction means disposed in said entrance means to throttle the passage of gas therethrough should said plate rupture and thus minimize the resulting reduction in gas supply to the other cells in the stack.

2. An electrode assembly in accordance with claim 1 wherein both said plates contain aligned transverse passageways through which a supply of gas may be passed and wherein said flow restriction means comprises a member having radial openings extending therethrough, said member limiting fluid communication between said aligned passageways and said plenum chamber to passage through said radial openings.

3. An electrochemical cell subassembly comprising an electrode assembly including a porous plate of sintered nickel which allows the passage of gas transversely therethrough, a gas-impervious metal plate having a depression formed therein, a weld line joining and electrically connecting said plates to each other at a location generally along the periphery of said depression to prevent fluid flow therebetween at the joinder and create a plenum chamber therebetween, said impervious metal plate in the area of said depression containing a plurality of indentations, each of which indentations is welded to said porous plate to electrically connect said plates at these points and to structurally support said plates against deflection in a transverse direction under the application of gas pressure, a deposit of an electropositive metal carried by said impervious metal plate on its surface opposite said plenum chamber, and entrance means in at least one of said plates for supplying gas to said plenum chamber, plus a mating frame, said frame having a vacant portion therein for accepting said porous plate from an electrode assembly located adjacent one side thereof and for accommodating an electropositive metal deposit carried by said impervious metal plate on the surface opposite said plenum chamber of another electrode assembly, means in said frame for providing an inlet flow of electrolyte into said vacant portion, means in said frame for providing for an outlet flow of electrolyte from said vacant portion, means formed as a part of said frame for sealing said vacant portion to prevent flow of electrolyte other than through said inlet or outlet means, said frame including slot means extending along parallel edges of said vacant portion, and said impervious metal plate having formed therein means for extending into said slot means and connecting said frame and electrode assembly in mating relationship.

4. The invention in accordance with claim 3 wherein said frame is formed with means extending into said vacant portions for spacing the edges of said porous plate from said adjacent interior edges of said frame that define said vacant portion and with means for engaging the exposed surface of said porous plate to limit the extent of its entry into said vacant portion.

5. The invention in accordance with claim 3 wherein said electrode assembly includes a plurality of separate porous plates which are interconnected in parallel electrical connection by said impervious metal plate and wherein said frame includes a plurality of vacant portions which are positioned to accept said plurality of porous plates.

6. The invention in accordance with claim 5 wherein said frame contains an inlet electrolyte plenum chamber which supplies electrolyte to said plurality of vacant portions, an outlet electrolyte plenum chamber into which the electrolyte from said plurality of vacant portions flows, said plenum chambers opening through one surface of said frame, and sealing ridge means upstanding from said one surface of said frame and surrounding each of said plenum chambers and being adapted to abut and seal against the opposite surface of another aligned frame.

7. A cell stack comprising a plurality of said subassemblies defined in claim 5 which includes means for holding said subassemblies under compression in aligned relationship so that said porous plates of one electrode assembly extend into said vacant portion of one frame while the electropositive metal deposit on said impervious metal plate extends into said vacant portion of said next adjacent frame so that electrochemical cells are in series-parallel electrical connection when electrolyte is circulated therethrough and gas passageway means extending through said plurality of subassemblies for supplying gas to cells which are aligned and in series electrical connection.

(References on following page)

References Cited

UNITED STATES PATENTS

| | | | |
|---|---|---|---|
| 3,293,078 | 12/1966 | Frye | 136—120 |
| 3,297,482 | 1/1967 | Zimmer | 136—86 |
| 2,969,315 | 1/1961 | Bacon | 136—120FC |
| 3,101,285 | 8/1963 | Tantrum et al. | 136—120FC |
| 3,372,060 | 3/1968 | Platner | 136—120FC |
| 3,359,136 | 12/1967 | Merten et al. | 136—30 |

FOREIGN PATENTS

| | | | |
|---|---|---|---|
| 871,950 | 7/1961 | Great Britain | 136—120 |

WINSTON A. DOUGLAS, Primary Examiner

C. F. LE FEVOUR, Assistant Examiner

U.S. Cl. X.R.

136—6, 86